(12) United States Patent
Miyao et al.

(10) Patent No.: US 7,827,533 B2
(45) Date of Patent: Nov. 2, 2010

(54) ANALYTICAL SERVER, PROGRAM ANALYSIS NETWORK SYSTEM, AND PROGRAM ANALYSIS METHOD

(75) Inventors: Satoshi Miyao, Kawasaki (JP); Hitoshi Ida, Yamato (JP); Yohji Yashiro, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 1259 days.

(21) Appl. No.: 10/263,121

(22) Filed: Oct. 2, 2002

(65) Prior Publication Data
US 2003/0093720 A1 May 15, 2003

(30) Foreign Application Priority Data
Oct. 3, 2001 (JP) .............................. 2001-307570

(51) Int. Cl.
G06F 9/44 (2006.01)
(52) U.S. Cl. ..................................... 717/126
(58) Field of Classification Search .................. 717/126
See application file for complete search history.

(56) References Cited

U.S. PATENT DOCUMENTS

| 5,757,659 | A | * | 5/1998 | Arai et al. ...................... 702/22 |
| 5,974,568 | A | * | 10/1999 | McQueen ...................... 714/38 |
| 6,275,223 | B1 | * | 8/2001 | Hughes ........................ 715/751 |
| 2004/0015823 | A1 | * | 1/2004 | Nolan .......................... 717/104 |

OTHER PUBLICATIONS

Nathan Meyers, "PerfAnal: A Performance Analysis Tool", Mar. 9, 2000, printed from http://java.sun.com/developer/technicalArticles/Programming/perfanal/ on Sep. 26, 2006.*

* cited by examiner

Primary Examiner—Philip Wang
(74) Attorney, Agent, or Firm—Ronald Kaschak; Hoffman Warnick LLC

(57) ABSTRACT

To offer a user an analysis service that identifies problems, in a program that includes a part that can be customized, an application reception processing section receives an analysis application for a program from a user via a network, a quick evaluation executing section automatically executes a quick evaluation that performs evaluation regarding typical causes of performance deterioration of a program with respect to the received analysis application, a quick evaluation report transmitting section transmits to the user a quick evaluation report that is a report of the executed quick evaluation, and a consulting results report transmitting section transmits to the user a consulting results report that includes results of detailed analysis by an analyst with respect to the analysis application received by the application reception processing section.

16 Claims, 7 Drawing Sheets

FIG. 4

| Evaluation result | Number of points | Comment |
|---|---|---|
| A | 0 | Cause of deterioration of performance could not be found. |
| B | 1-3 | Cause of deterioration of performance potentially exists. |
| C | 4-8 | Cause related to performance problem has been found. Consider implementation of "consulting" service. |
| D | 9 or more | Many causes related to performance problems have been found. Implementation of "consulting" service is recommended. |

FIG. 6

```
Problem point
        Data source acquisition has been performed for each transaction,
        which is not desirable from a performance standpoint.
Solution
        Perform data source acquisition in initialization processing,
        or provide for centralized management.
Sample code
```

Source code of problem location

Example of servlet doPost() {

.....

Object anObject = initialContext.lookup(aName);
datasource = (javax.sql.DataSource)javax.rmi.PortableRemoteObject.narrow(anObject,
javax.sql.DataSource.class);

.....

}

Source code after correction init() {

.....

Object anObject = initialContext.lookup(aName);
datasource = (javax.sql.DataSource)javax.rmi.PortableRemoteObject.narrow(anObject,
javax.sql.DataSource.class);

.....

}

Applicable code: D1000
        lookup method retrieval
        Error my occur if lookup method is called within business
        method.
        init method for which class is servlet is not included in
        business method.
        bussinesMethod() {
        initialContext.lookup();
        }
Applicable rules:
Applicable flag:

ANALYTICAL SERVER, PROGRAM ANALYSIS NETWORK SYSTEM, AND PROGRAM ANALYSIS METHOD

FIELD OF THE INVENTION

The present invention relates to a system that supports program diagnosis and analysis.

BACKGROUND

Recently, groupware has come into wide use as software to enable cooperative working by a plurality of persons on a network. With such groupware, work efficiency and productivity can be improved, transmission speed increased, and so forth, by means of, for example, information transmission using e-mail or electronic bulletin boards, information sharing by means of group scheduling, and so forth, information analysis and arrangement via a main database, and the like.

A typical example of such groupware is "Notes/Domino" produced by Lotus Corporation of the USA. "Notes/Domino" is a client server system that runs on a network, and is provided with basic functions such as e-mail, a compound distribution document database, replication processing, and integration into a communication environment in a desktop environment. "Notes/Domino" is also provided with customization functions that allow a range from simple items oriented toward end-user development to high-speed items that perform programming to be used easily at high speed according to the particular purpose. In this way, it is possible for a developer to perform customization processing according to a particular purpose simply by means of incorporation into the "Notes/Domino" database without considering settings for a remote server and without having to worry about a client's type of machine.

In this way, effective processing is possible in accordance with organizational and other techniques by means of customization functions provided by "Notes/Domino" itself. On the other hand, problems arise in terms of design in "Notes/Domino" applications. There is no particular agreed method for verifying and evaluating these design problems, and at present design information in a database is checked and assessed one item at a time.

However, with a method whereby design information is checked and assessed one item at a time, work efficiency is poor and it is not possible to see the relationship between objects. Also, unless an explanation of the detailed contents is received from the developer, it is extremely difficult to grasp the problems and an overall picture of the database, and there is no alternative but to entrust the tasks of database verification and evaluation to the developer. Moreover, there have been many cases where a developer without in-depth experience of "Notes/Domino" development has created a database making full use of the "Notes/Domino" functions known to the developer at that point in time, without considering performance or maintenance, and performance has deteriorated after system testing or operation has begun.

Furthermore, with the application development/maintenance functions currently offered by "Notes/Domino", there are cases where such problems arise from the difficulty of seeing design information, from not being able to reference design information from a variety of angles, and being able to obtain design information as a text file but finding it difficult to understand. As a result, debugging efficiency is poor, and progress, quality, and change management is difficult, with the result that group development is hindered and maintenance is difficult to carry out.

These problems are major causes of a deterioration in productivity and quality in "Notes/Domino" application development and maintenance.

Also, reference documentation concerning performance now exists, but it is difficult to identify causes of deterioration of performance with these reference documents, or to find effective improvement measures. Reasons for this include the following:

Although causes of deterioration are included in the reference documentation, the coverage is not of a sufficient level to enable the relevant reasons to be understood.

It is not possible to judge how bad the causes of deterioration are.

There are too many causes of deterioration, and it is not known which apply.

The stated improvement proposals are lacking in practical detail.

There is no way of checking the cause of deterioration of the relevant application.

There is material concerning performance, but it is not possible to ascertain which part of the relevant application has an effect.

Moreover, when performance is poor, in many cases a request for improvement comes from top management in a top-down fashion, and it is necessary to conduct an investigation into causes of deterioration of performance, and draw up proposals for improvement, in a short time, and to implement solutions quickly. In most cases, therefore, a developer is not given enough time to conduct recurrence testing, read the reference documentation, and investigate proposals for improvement.

Meanwhile, development of applications using Java is increasing (Java and all Java-based trademarks are trademarks of Sun Microsystems, Inc. in the United States, other countries, or both). However, since developers are as yet inexperienced in Java, the programs they write have many problems. Also, in development using Java, performance problems and memory leak problems are often identified at the stage at which load testing is carried out, and program changes are often carried out of necessity in the latter half of the development schedule.

In order to solve these problems, a program review needs to be conducted at an early stage, but there are not enough people capable of conducting a review. At present, a review involves the following:

Obtaining the program code subject to review,

Implementing the review,

Collating the results of the review and preparing a report,

Sending the report to the developer, and

Conducting a questionnaire as to whether or not the analysis results are valid.

By automating this series of workflow steps, it is possible to achieve a reduction in workloads and solve the problem of lack of personnel.

However, automating the above described workflow involves problems such as the following:

If a review is conducted using an analysis tool, automation will be promoted, but there is a limit to the problems that are revealed automatically by an analysis tool, and not all problems can be brought to light.

With manual analysis, there will be variations in the level of analysis according to differences in the skill of individuals. At present, most problems found by manual analysis are of known patterns. However, as conditions are complex, it is not possible to use tools, and so forth Normally, a review is carried out by a plurality of personnel, and there is the task of collecting the results into a single format.

SUMMARY

In order to achieve workflow automation, and implement code reviews of a large number of projects or code reviews as a business, it is necessary to suppress variations in analysis levels due to personnel, and devise a means of merging tool and manual results efficiently.

The present invention has been devised in order to solve such technical problems, and it is an object of the present invention to easily reveal problems of a program that includes a part that can be customized.

Another object of the present invention is to reveal problems in the program code of a Java program or the like, automate the provision of a means of solution, and so forth, and improve work efficiency and raise the level of problem analysis.

Based on these objects, the present invention is an analytical server that analyzes problems in a predetermined program, and is provided with application receiving means for receiving an application for analysis on a program including design information that is information necessary for parameter setting for executing the program; design information viewer generating means for generating a design information viewer whereby a view is designed so as to enable a relationship between databases and/or between forms to be determined from design information received by the application receiving means; quick evaluation executing means for executing quick evaluation for a typical performance deterioration cause based on design information received from the application receiving means; quick evaluation report creating means for creating a quick evaluation report based on a design information viewer generated by the design information viewer generating means and a quick evaluation executed by the quick evaluation executing means; check-sheet creating means for referencing a design information viewer generated by the design information viewer creating means and creating a check-sheet for performing problem point analysis; and consulting results report creating means for creating a consulting results report based on check results obtained for the check-sheet.

An analytical server to which the present invention is applied is provided with an application receiving section that receives an application for analysis on a program from a user via a network; a quick evaluation executing section that executes quick evaluation that performs evaluation automatically with regard to a typical performance deterioration cause of a program with respect to an analysis application received by the application receiving section; a quick evaluation report transmitting section that transmits to the user a quick evaluation report that is a report of a quick evaluation executed by the quick evaluation executing section; and a consulting results report transmitting section that transmits to the user a consulting results report containing results of detailed analysis by an analyst with respect to an analysis application received by the application receiving section.

Here, if this application receiving section is further provided with a design information viewer creating section that receives design information that is information necessary for parameter setting for executing a program, and based on the received design information, creates a design information viewer that allows references and queries to a plurality of views, this is desirable inasmuch as a user or analyst can reference and query design information in a versatile manner based on this design information viewer.

Moreover, if the present invention is further provided with an explanatory material selection sheet creating section that creates an explanatory material selection sheet on which is indicated contents necessary for material creation from consulting check results that are results of analysis by an analyst, and an explanatory material creating section that obtains contents indicated in this explanatory material selection sheet from a contents master and creates explanatory material, this is advantageous inasmuch as the required contents is made clear by means of the explanatory material selection sheet and the materials creation workload is alleviated by means of the explanatory material creating section.

Considered from another viewpoint, an analytical server to which the present invention is applied is provided with program code obtaining means for obtaining the program code of a Java program or the like; tool analysis executing means for executing tool analysis by means of a tool for indicating a problem place with respect to program code obtained by this program code obtaining means; manual analysis results obtaining means for obtaining results of manual analysis analyzed manually with respect to a problem not analyzed by this tool analysis; and report creating means for creating a report in which are merged results of tool analysis executed by this tool analysis executing means and results of manual analysis obtained by manual analysis results obtaining means.

Here, if the results of tool analysis executed by this tool analysis executing means and the results of manual analysis obtained by manual analysis results obtaining means are indicated in a format unified for program code line number and error code, it is possible to easily perform merging of tool analysis results and manual analysis results.

Also, it is possible to further provide a knowledge database containing applicable rules in which are written rules whereby problems are patterned, and for the manual analysis results obtaining means to obtain results of manual analysis analyzed with the support of this knowledge database. By receiving the support of this knowledge database, an analyst can improve the level of analysis. Moreover, it is possible for problem sharing to be achieved by incorporating analysis results in a database.

On the other hand, the present invention includes a program analysis network system. In this system, a user provided with a program requiring analysis, an analytical server that receives an application from the user and performs program analysis, and an analyst who performs analysis of the program manually, are connected via a network, and this analytical server performs quick evaluation on the program based on a predetermined standard and provides a quick evaluation to the user via the network, and also provides the user via the network with results of more detailed analysis by the analyst than the quick evaluation.

Furthermore, the present invention includes a program analysis method that analyzes problems in a predetermined program based on a request from a user connected to a network, and creates a design information viewer whereby a view is designed so as to enable a relationship between databases and/or between forms to be determined from design information that is information necessary for parameter setting for executing the program, provides the created design information viewer to an analyst who analyzes problems of the program, references the provided design information viewer and obtains analysis results produced by the analyst, and outputs to the user a consulting results report created based on the obtained analysis results.

Considered from another viewpoint, a program analysis method to which the present invention is applied makes it possible to provide a user via a network a quick evaluation that is a result of rapid evaluation not involving manual intervention with respect to a program, and to provide the user via the network detailed analytical evaluation results via manual intervention after providing this quick evaluation.

Moreover, a program analysis method to which the present invention is applied acquires code of a Java program via a network, executes tool analysis using a tool for indicating a problem place with respect to acquired Java program code, obtains manual analysis results by manual means with respect to acquired Java program code, and outputs to the user analysis results in which the results of the executed tool analysis and the obtained manual analysis results are merged.

BRIEF DESCRIPTION OF THE DRAWINGS

The present invention will now be described in detail based on the embodiments shown in the attached drawings, in which:

FIG. 4 shows sample evaluation results of a quick evaluation;

FIG. 6 is drawing for explaining an example of a description of a knowledge database to which these embodiments are applied.

DETAILED DESCRIPTION

Figure 1:
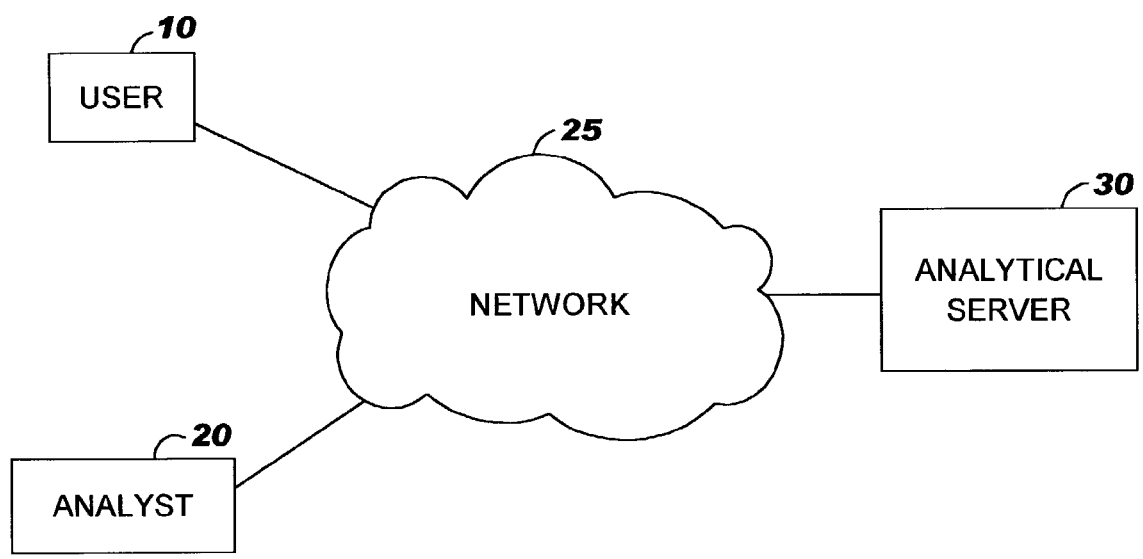
FIG. 1 is a drawing showing the overall configuration of a program analysis support system to which these embodiments are applied.

FIG. 1 is a drawing showing the overall configuration of an exemplary program analysis support system to which the invention may be applied. The system comprises a user 10 who requests analysis of design problems in a "Notes/Domino" application, for example, an analytical server 30 that creates a design information viewer and provides this to the user 10, and an analyst 20 who refers to a design information viewer created by the analytical server 30 and performs detailed analysis. These are connected via a network 25 such as the Internet. It is possible for the network between the user 10 and the analytical server 30 and the network between the analytical server 30 and the analyst 20 to be of different kinds.

In this embodiment, a quick evaluation is first performed automatically for simple contents by the analytical server 30, and is provided to the user 10. With regard to detailed contents, a results report is prepared by the analyst 20 who is conversant with the program. Meanwhile, in the design information viewer created by the analytical server 30, a plurality of different kinds of views have been prepared, and design information references and inquiries can be carried out in a versatile manner. Obtaining this design information viewer is of great assistance to the user 10 and analyst 20 in analyzing problems, and enables necessary information to be obtained in a short time.

Figure 2:
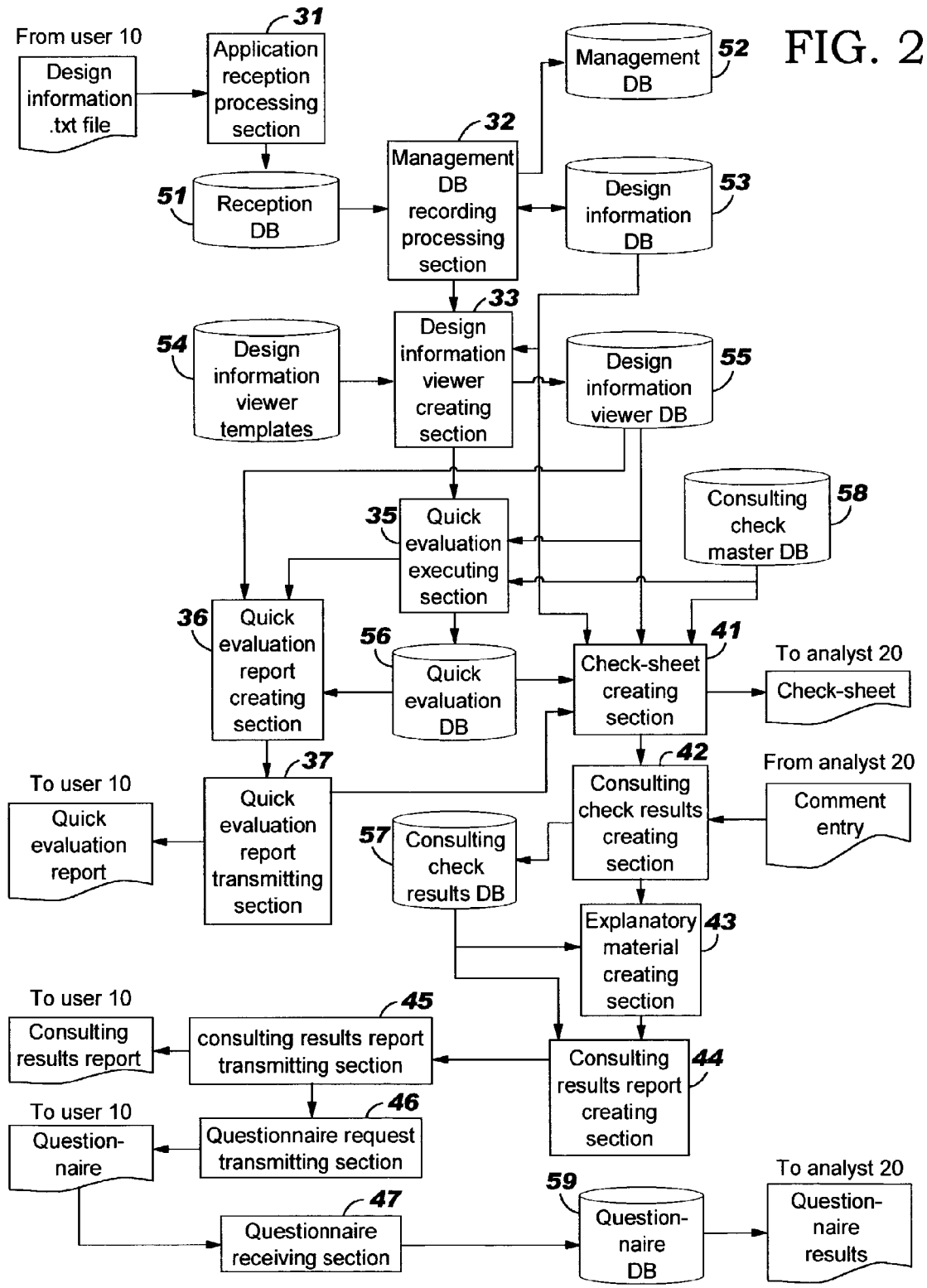
FIG. 2 is a drawing for explaining the configuration of the analytical server.

FIG. 2 is a drawing that shows an exemplary configuration of the analytical server 30. The analytical server 30 to which this embodiment is applied is provided with an application reception processing section 31 that receives analysis applications from the user 10 via the network 25, a management DB recording processing section 32 that performs management DB (database) recording processing, a design information viewer creating section 33 that creates a design information viewer, a quick evaluation executing section 35 that creates a quick evaluation that performs evaluation automatically for typical causes of performance deterioration, a quick evaluation report creating section 36 that creates a quick evaluation report provided to the user 10 based on a design information viewer created by the design information viewer creating section 33 and quick evaluation results created by the quick evaluation executing section 35, and a quick evaluation report transmitting section 37 that transmits a created quick evaluation report to the user 10.

Also provided are a check-sheet creating section 41 that creates a check-sheet provided to the analyst 20, a consulting check results report creating section 42 that creates consulting check results including comments, and so forth, entered by the analyst 20 with regard to the check-sheet, an explanatory material creating section 43 for giving explanations to the user 10, a consulting results report creating section 44 that creates consulting results to be provided, including explanatory material, and a consulting results report transmitting section 45 that transmits a consulting results report to the user 10 via the network 25. Further provided are a questionnaire request transmitting section 46 that transmits a questionnaire to the user 10 after the elapse of a predetermined interval following transmission of a consulting results report by the consulting results report transmitting section 45, and a questionnaire receiving section 47 that receives a questionnaire transmitted from the user 10.

Meanwhile, the following are provided as databases (DBs) stored on a recording medium such as a hard disk drive: a reception DB 51 that stores project information that has undergone reception processing by the application reception processing section 31, design information (.txt files), an analysis object database, analysis types, user information and similar application related information; a management DB 52 that stores management information processed by the management DB recording processing section 32; a design information DB 53 that stores design information that has undergone reception processing by the application reception processing section 31 and has been processed by the management DB recording processing section 32; design information viewer templated 54 comprising a database in which are stored templates used in creating design information viewers; and a design information viewer DB 55 that stores viewers created by the design information viewer creating section 33. Also provided are a quick evaluation DB 56 that stores quick evaluation information created by the quick evaluation executing section 35; a consulting check results DB 57 that stores consulting check results created by the consulting check results report creating section 42; a consulting check master DB 58 that is updated by a results report created by the consulting results report creating section 44; and a questionnaire DB 59 that stores received questionnaires.

Figure 3:
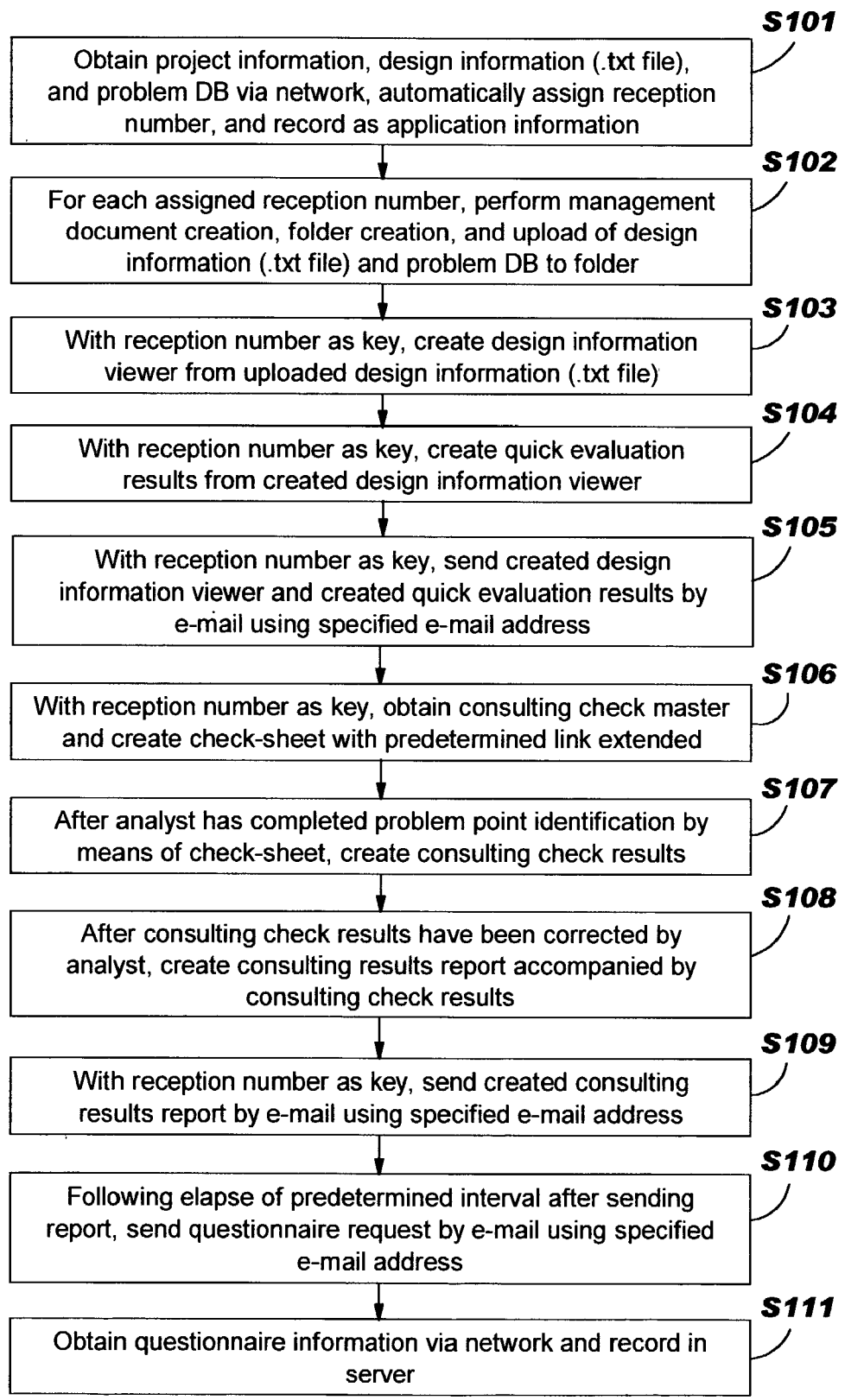
FIG. 3 is a flowchart showing program diagnosis processing executed by the analytical server.

FIG. 3 is a flowchart showing program diagnosis processing executed by the analytical server 30. First, the application reception processing section 31 of the analytical server 30 obtains a DB comprising project information, design information (a .txt file), and problems from the user 10 via the network 25, automatically assigns a reception number, and records this as application information in the reception DB 51 (Step 101).

Design information (.txt file) can be defined as information necessary for parameter setting in order to execute a program, for example. A characteristic of this embodiment is that, for a program of the kind that the user 10 (developer, server administrator) can set and design, diagnosis is performed for a program that includes a part that does not depend on an application, and a part that can be customized, for example. Different design information (a different .txt file) created by a user 10 may be generated in text data form, for example, for each user 10 with regard to contents requiring diagnosis, and may be transmitted to the analytical server 30 as an e-mail attachment.

Next, the management DB recording processing section 32 of the analytical server 30 performs management document creation, folder creation, and an upload to a folder of a DB comprising design information (.txt file) and problems to the management DB 52 and design information DB 53 for each reception number assigned in Step 101 (Step 102).

Then the design information viewer creating section 33 creates a design information viewer from the design information (.txt file) uploaded with the reception number as a key (Step 103), and the created design information viewer is stored in the design information viewer DB 55. Design information viewer creation will be described later herein. Following this, the quick evaluation executing section 35 creates quick evaluation results from the created information, with the reception number as a key (Step 104), and the created quick evaluation results are stored in the quick evaluation DB 56. Quick evaluation results will be described later herein.

Next, the quick evaluation report creating section 36 reads the created design information viewer and created quick evaluation results from the design information viewer DB 55 and quick evaluation DB 56 using the reception number as a key, and creates a quick evaluation report. The created quick evaluation report is sent to the user 10 by the quick evaluation report transmitting section 37 by means of e-mail using the specified e-mail address (Step 105).

Meanwhile, the check-sheet creating section 41 obtains the consulting check master from the consulting check master DB 58, using the reception number as a key, and creates a check-sheet to which a predetermined link is extended (Step 106). The check-sheet thus created is provided to the analyst 20 via the network 25. A sample check-sheet screen image and sample consulting check master screen image will be described later herein. Next, after the analyst 20 has received the check-sheet and identified the problem, consulting check results are created by the consulting check results report creating section 42 (Step 107). An example of a screen image of consulting check results will be described later herein.

Following this, explanatory material is created by the explanatory material creating section 43, and after the consulting check results have been corrected by the analyst 20, the consulting results report creating section 44 creates a consulting check results report accompanied by the consulting check results (Step 108). The consulting results report transmitting section 45 then sends the created consulting results report to the user 10 by e-mail using the specified e-mail address (Step 109). Then, following the elapse of a predetermined interval after this report is sent, the questionnaire request transmitting section 46 makes a questionnaire request to the user 10 by e-mail using the specified e-mail address (Step 110). The questionnaire receiving section 47 then obtains questionnaire information via the network 25, and records it in the questionnaire DB 59 (Step 111). This completes program analysis processing by the analytical server 30.

Next, the creation of a design information viewer shown in Step 103 in FIG. 3 will be described. A design information viewer is created by the design information viewer creating section 33, and at this time a design information viewer is newly created for an application referenced from the design information viewer template 54 database. It is desirable for the following items, for example, to be considered for the design information viewer template 54 database:

Displaying view column values only when there is a problem or when different from the default setting, Design that enables the number of objects to be easily ascertained, Using icons, colors, size, and so forth, to enable a set location to be determined intuitively, Providing a plurality of views (100 or more, for example) to allow analysis in a versatile manner, Providing a plurality of navigator to allow categories. Also, not obtaining color, size, font, and so forth Furthermore, entering default settings in a form to enable independent settings by a project to be determined, Designing views to enable relationships between databases and between forms to be determined, and Creating views that allow cross-referencing.

Various aspects may be considered in various screens, for example, "Whether or not the number of fields set with regard to default value/input validation/input translation is large" is checked, or "Whether or not there are many view sort columns". It is possible to confirm subroutine names and function names called by a script.

In this design information viewer creation processing, the design information viewer creating section 33 opens design information (a .txt file) uploaded by the analytical server 30 with the reception number as a key, reads it line by line, performs determination with that string, and creates a document in the design information viewer. At this time, an item that will be needed later to create a certain document is held in predetermined memory. Also, addition is performed as regards a value required in evaluation by a subsequent agent (program) or a value required when displaying a view. Here, in order to enable the location of an object to be grasped easily, and to identify objects in the case of identical names, a database name, form name, view name, and so on, are also added to lower objects. Here, forms corresponding to hidden (field), sub-form, section, layout, shared field, action, hot-spot, and so forth, set as forms are assigned correspondence to a database, and given correspondence between objects. The analytical server 30 creates a document for totaling anew from a created document with the reception number as a key, and functions called from a created document are calculated using the reception number as a key. Moreover, a created design information viewer undergoes file compression using the reception number as a key, and a design information viewer on which this file compression has been performed is transmitted to the user 10 together with a quick evaluation report described later herein.

Next, the creation of quick evaluation results in Step 104 in FIG. 3 will be described in detail. The quick evaluation executing section 35 opens design information (a .txt file) uploaded with the reception number as a key, reads it line by line, performs determination with that string, and executes evaluation in accordance with predetermined evaluation criteria and also by means of a predetermined evaluation result calculation method. At this time, a configuration is possible whereby related locations are held in predetermined memory and quick evaluation results are calculated together at the end.

Check items 1 through 14 below are examples of predetermined evaluation criteria to be met in quick evaluation. In the case of "Relevant" among these check items, one point is added in evaluation. In the case of "Caution required", a further 3 points are added, and used in subsequent evaluation calculation.

1. Concerning the frequency of use of @DbLookup and @DbColumn functions in one form A form in which @DbLookup and @DbColumn functions are used 6 or more times is relevant.

If these are used 10 or more times, "Caution required" is displayed.

2. Concerning the use of @Now, @Today, @Yesterday, and @Tomorrow functions in a view A view in which an @Now, @Today, @Yesterday, or @Tomorrow function is used in a view selection formula or column formula is relevant.

In the case of a DB with 1000 or more documents, "Caution required" is displayed.

3. Concerning the number of fields and the number of computed fields in a form

A form for which the number of computed fields in one form is 100 or more, or the total number of fields in one form is 200 or more, is relevant.

If the number of computed fields is 100 or more and the total number of fields is 200 or more, "Caution required" is displayed.

4. Concerning "Automatically refresh fields"

A form for which "Automatically refresh fields" is set is relevant.

If the total number of computed fields, computed for display fields, input validation fields for which a formula is set, and input translation fields for the relevant form is 100 or more, "Caution required" is displayed.

5. Concerning "Store form in documents"

A form for which "Store form in documents" is set is relevant.

If the number of fields for the relevant form is 50 or more, "Caution required" is displayed.

6. Concerning number of views

A database for which 30 or more views are stored in one database is relevant.

If 50 or more views are stored in one database, "Caution required" is displayed.

7. Concerning number of view columns

A view for which there are 15 or more columns in one view is relevant.

If there is a view for which there are 20 or more columns in one view, "Caution required" is displayed.

8. Concerning "Unread marks"

A view for which a setting other than "None" is made for Unread marks is relevant.

If a view for which "Standard (compute in hierarchy)" is set for Unread marks, "Caution required" is displayed.

9. Concerning "Discard index"

A view for which a setting other than "Never" is made for discard index is relevant.

If a view for which "After each use" is set for discard index, "Caution required" is displayed.

10. Concerning cases where there are unnecessary design elements in a view

A hidden view for which there are 1 or more actions or 4 or more columns in view is relevant.

If there is a hidden view for which there are 3 or more actions or 6 or more columns in one view, "Caution required" is displayed.

11. Concerning readers field

A case where the number of documents that can be referenced by an end-user in a DB with 5000 or more documents is 5% or less of the total, and there is a readers field, is relevant.

If the number of documents that can be referenced by an end-user in a DB with 10000 or more documents is 5% or less of the total, and there is a readers field, "Caution required" is displayed.

12. Concerning number of script lines

A case where the total number of script lines in one form, view, and so forth, is 500 or more is relevant.

If the total number of script lines in one form, view, and so forth, is 1000 or more, or there are 500 lines or more in a view, or there are 500 lines or more in an agent, "Caution required" is displayed.

13. Concerning script (Save)

A case where xxx.save is used two or more times in the same uidocument class is relevant.

If xxx.save is used three or more times in the same uidocument class, "Caution required" is displayed.

14. Concerning script (Refresh)

A case where xxx.refresh is used once in the same uidocument class is relevant.

If xxx.refresh and xxx.save is used once or more in the same event, or xxx.refresh is used two or more times, in the same uidocument class, "Caution required" is displayed.

FIG. 4 shows sample evaluation results 400 of a quick evaluation. Based on the above described evaluation criteria, the number of points is counted, and the evaluation result is determined in accordance with the number of points. In this example, a comment comprising a standard form is shown corresponding to the evaluation result. As the standard form, in the case of evaluation result A, for example, where the number of points is 0, the comment "Cause of deterioration of performance could not be found." is shown. Thereafter, for evaluation results B through D, the standard form comments "Cause of deterioration of performance potentially exists.", "Cause related to performance problems has been found. Consider implementation of "consulting" service.", and "Many causes related to performance problems have been found. Implementation of "consulting" service is recommended." are shown, respectively. The above described number of points is calculated by evaluation from a performance viewpoint, and does not take specifications, and so forth, into consideration. The quick evaluation report creating section 36 uses this comment to create a quick evaluation report. After this, the processing flow proceeds to Step 105, and a quick evaluation report containing this comment is transmitted to the user 10.

Next, the check-sheet created by the check-sheet creating section 41 described in Step 106 in FIG. 3 will be described. In the check-sheet, checks are performed for, for example, 109 items, and a link is established to predetermined information. With this check-sheet, it is possible to reference as appropriate obtained application information, a DB comprising uploaded problems, a created design information viewer, created quick evaluation results, and so forth. An item can be referred to by clicking the corresponding location. For individual evaluation items, correspondence is established with a consulting check master obtained from the consulting check master DB 58. Clicking the relevant area on the right of a screen display of a check sheet enables the necessary consulting check master to be seen.

A consulting check master shows the problem analysis and problem solution flow, such as "This kind of problem will occur if this kind of pattern occurs" and "This kind of remedial action is available for this kind of problem", for example, and is useful for design evaluation. Here, bibliographical items such as serial number, contents, and category, are shown together with significance, quick evaluation contents, problem point category, problem point details, and so forth. Also, problems and corresponding solutions are shown. In addition, check criteria, check methods, past report link information, and so forth, are shown as reference information.

Next, the consulting check results shown in Step 107 in FIG. 3 will be described. Based on a check-sheet comment entered by the analyst 20, the consulting check results report creating section 42 enters bibliographical items such as number and category, significance, difficulty, contents, problems, solution, comment, and so forth, and reports these as consulting check results. When this report is created, a link is extended by the analytical server 30 to the corresponding consulting master so that past consulting results can be referenced in the future. For consulting check results created in this form, the explanatory material creating section 43 creates explanatory material using a file format that is readily understood by the user 10, and the consulting results report creating section 44 creates a consulting results report, after which this report is transmitted to the user 10 from the consulting results report transmitting section 45 using the specified e-mail address.

Figure 5:
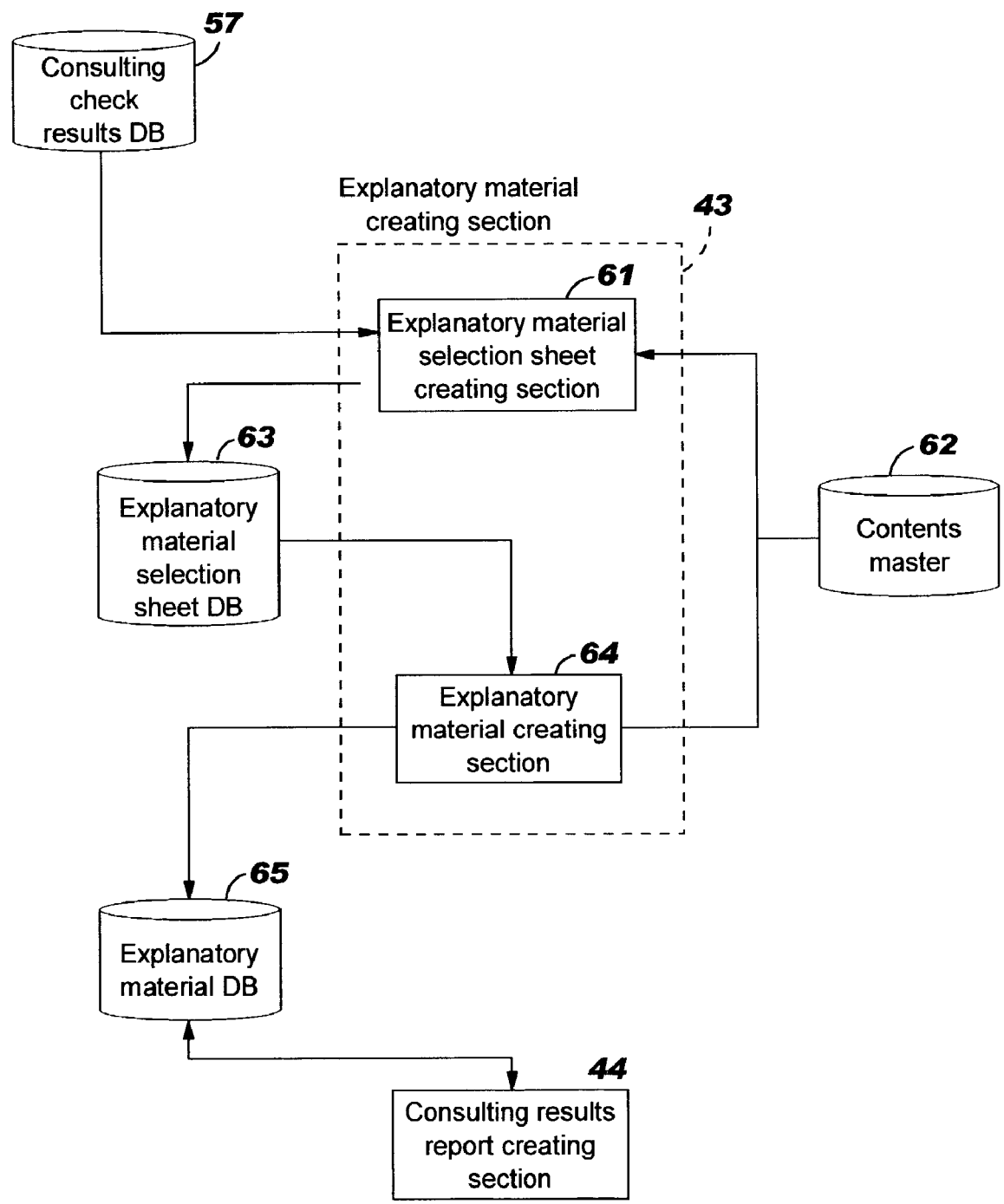
FIG. 5 is a more detailed block diagram of the processing executed by the explanatory material creating section.

FIG. 5 is a more detailed block diagram of the processing executed by the explanatory material creating section 43. Provided here are an explanatory material selection sheet creating section 61 that creates a material selection sheet for explanation, a contents master 62 in which is stored content necessary for material creation, an explanatory material selection sheet DB 63 that stores created explanatory material selection sheets, an explanatory material creating section 64 that creates explanatory material using an explanatory material selection sheet and contents stored in the contents master 62, and an explanatory material DB 65 that stores created explanatory material. The consulting results report creating section 44 creates a consulting results report based on explanatory material stored in the explanatory material DB 65.

In an explanatory material selection sheet created by the explanatory material selection sheet creating section 61, the number, category, and contents corresponding to the consulting check results are displayed together with applicant information. Also, the screen image is provided with a check flag and page image specification area. Clicking a page image button enables contents information to be read from the contents master 62 and displayed in the screen image.

A screen image of contents information stored in the contents master 62 can be specified and displayed from an explanatory material selection sheet. This contents information screen image shows problems likely to occur, and improvement measures, for an access control list.

Explanatory material created by the explanatory material creating section 64 is newly created by means of contents obtained from the contents master 62 using an explanatory material selection sheet. Explanatory material created in this way is stored in the explanatory material DB 65. Thus, according to this embodiment, necessary contents are obtained on the analytical server 30 side from the contents master 62 using the contents number as a key, and explanatory material is created. By this means, the explanatory material creation workload can be greatly reduced.

The explanatory material creation system can be applied to the creation of various kinds of explanatory files, including proposals, project plans, system configuration diagrams, product information, and so forth. For example, a configuration is possible whereby the user 10 selects necessary contents from the Web, the analytical server 30 obtains the necessary contents from the contents master 62 using the contents number as a key, creates an explanatory file, and sends back that created explanatory file to the user 10. According to this system, the user 10 makes clear the necessary contents and a file is created automatically, thereby making it possible to greatly reduce the explanatory file creation workload, and to make effective use of knowledge throughout the company. This is especially useful in creating standard files. For this kind of use, it is only necessary to make the explanatory material selection sheet a "file creation application sheet", have the analytical server 30 obtain this file creation application sheet from the user 10 via the network 25, and record it as application information, and thereafter to compress the explanatory material and transmit it to the user 10 using the specified e-mail address.

As described above, with this embodiment, design information (a .txt file) is obtained from a user 10 via a network 25 such as the Internet, and the analytical server 30 performs evaluation from a performance viewpoint using this obtained information, and sends back evaluation results and problems and sample solutions for the relevant items to the user 10 using mail, and so forth. By this means, when identifying performance problems in terms of design in a predetermined program, it is possible to make effective use of information obtained from the user 10 (a problem DB and project information) and existing program functions (design list, file writes), and so forth.

Also, the analyst 20 can identify problems by means of a check-sheet to which links, and so forth, are extended, and can re-use previously acquired knowledge without reserve and easily access necessary information, making it possible to execute work thoroughly and efficiently.

Moreover, with this embodiment, when a design evaluation request is made from a user 10 to the analytical server 30, reporting is carried out in two stages: first, a quick evaluation report that performs analysis quickly by means of automatic diagnosis, and then a consulting results report which is a detailed analysis to which a check by a specialized analyst 20 is added. With the quick evaluation report, the fact that typical causes of performance deterioration are evaluated automatically enables defects and problems to be identified at an early development stage through regular use. That is to say, the user 10 can receive a standardized evaluation report immediately for clearly defined problems and solutions, enabling problems to be solved quickly.

A design information viewer provided to the user 10 side can be used by a developer, project leader, and a maintenance engineer on the user 10 side. A developer can obtain design information from an actual database, enabling timely and real design information to be obtained. Also, by making effective use of views, design information can be referenced and displayed from various angles. For a project leader, on the other hand, it is possible to grasp the state of progress of development implementation in numerical terms. Furthermore, a maintenance engineer can implement continuity, and so forth, smoothly thanks to the categorization of database design information in a readily understandable fashion.

In the embodiment of the invention just described, called here Embodiment 1, a program such as a "Notes/Domino" application, for example, is taken as the object, and design information comprising information necessary for parameter settings to execute the program is provided to the server side, and diagnosis is made possible for customized parts that differ for each user. In another embodiment of the invention, called here Embodiment 2, an example of application to a system that supports the identification of Java program problems and the introduction of solutions will be described as a use of the present invention. Parts that are identical to those in Embodiment 1 are assigned the same codes as in Embodiment 1, and their detailed explanations are omitted.

Heretofore, in Java program code analysis, in order to suppress variations in analysis levels, a plurality of persons have performed a review of one piece of code, and improvement of the analysis level has been undertaken through meetings and so forth. Also, sharing of problems by incorporating analysis results in a database has been studied. However, holding meetings requires a further increase in workloads, and information in database form is large in quantity, so that comparison by acquiring information in database form and program code is not realistic.

Thus, as described above, in Embodiment 2, as in Embodiment 1, in order to achieve workflow automation and improve work efficiency a distinction is made between problems that can be analyzed with a tool and problems that are analyzed manually, and techniques are introduced to support the portion analyzed manually. Techniques that support analysis enable experience accumulated in the past to be used without reservation and to be made independent of an individual's skill level. Furthermore, a technique is provided that automatically generates a report combining results of analysis with a tool and results of manual analysis.

First, in Embodiment 2, a Java program requiring analysis—that is, actual Java source code—is transmitted from the user 10 to the analytical server 30 shown in FIG. 1. In the analytical server 30, a knowledge database is created, and problems and solutions, and so forth, are created for around 200 items, for example. The analytical server 30 includes a knowledge database creating section (not shown) that creates this knowledge database, and the analyst 20 can refer to this knowledge database and execute a program code review.

FIG. 6 is a drawing for explaining an example of a description of a knowledge database 600 to which this embodiment is applied. This knowledge database 600 includes problems, solutions, sample code, applicable rules, and applicable flags (not shown). In addition, items for grouping information can be created as necessary.

First, under "Problem point", an explanation is given of what kind of problem is caused for what kind of reason by the relevant problem. Under "Solution", a correction/modification method for the problem point is explained. Under "Sample code", the problem point and solution are illustrated with pseudo code. Here, the source code at the problem location and source code after correction are shown. Under "Applicable code", systematized code within the relevant system is given. When analysis is possible using a tool, this is configured so as to enable correspondence (linkage) to an error code, and so forth, used by the tool. Under "Applicable rules", rules whereby the problem is patternized are given in order to support analysis. "Applicable flag" is used to differentiates between problems that are analyzed by means of a tool and problems that are analyzed manually. Under "Applicable rule", the order to be used when a person identifies a problem is given explicitly. The purpose is not to have this entire rule (sequence) applied to automatic analysis with a tool. However, it is desirable for at least one of these procedures to be automated with a tool.

Actual creation of a knowledge database includes a part used heretofore. A characteristic of a system according to this embodiment is that an analysis results margin with respect to a tool can easily be established by first providing applicable code for manual analysis. A further characteristic is that differences in analysis levels due to individuals' skills are reduced by the applicable rule description.

Figure 7:
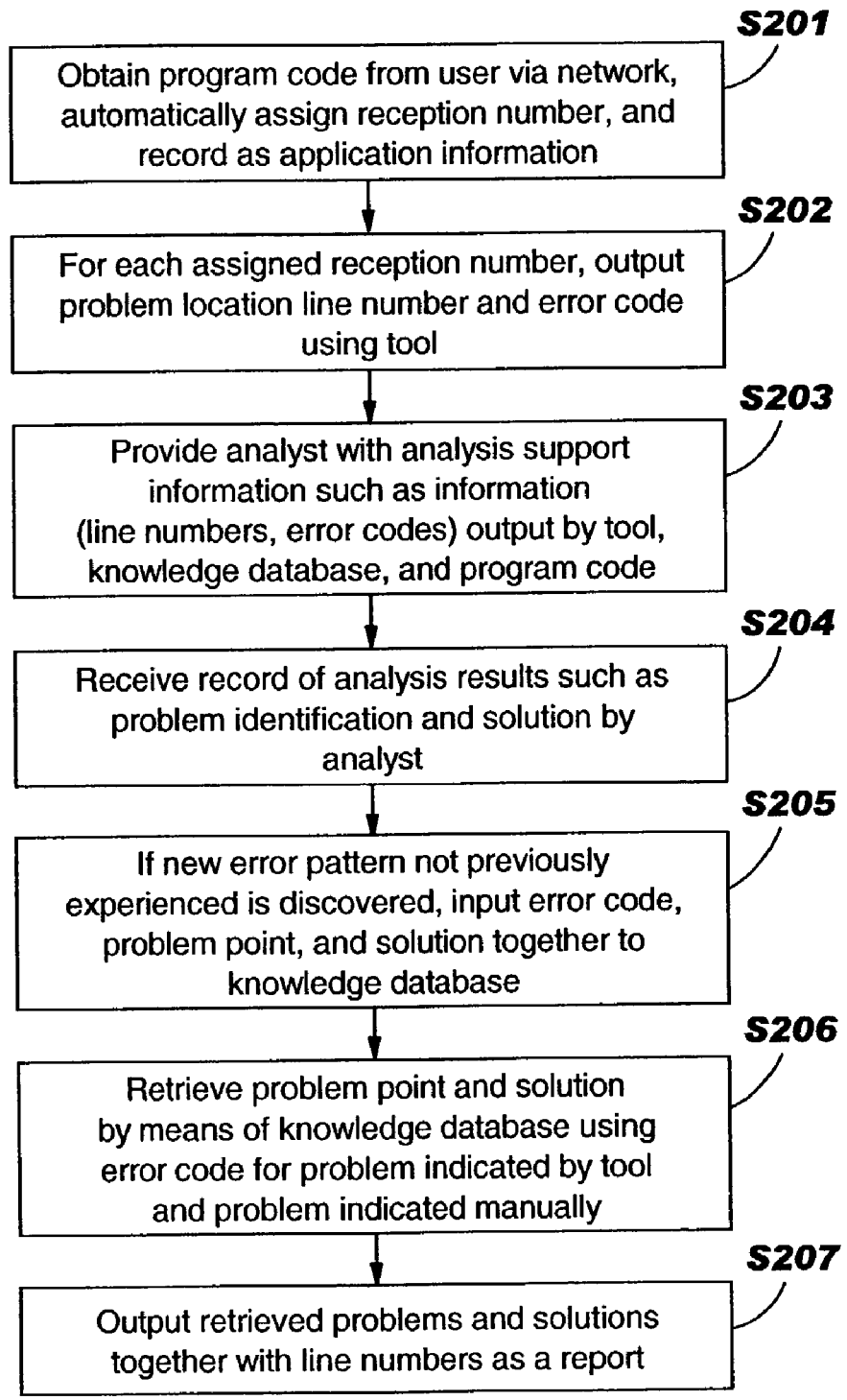
FIG. 7 is a flowchart showing processing executed by the analytical server when performing a program code review.

FIG. 7 is a flowchart showing processing executed by the analytical server 30 when performing a program code review. First, the analytical server 30 obtains Java program code from a user 10 via a network 25 such as the Internet, automatically assigns a reception number, and records it as application information (Step 201).

To be specific, the relevant code is recorded as follows:

```
Class testProgram extend HttpServlet {
    void int ( ) {
    }
    doPost ( ) {
        Object anObject = initialContext.lookup (aName);
        datasource
=   (javax.sql.DataSource)    javax.rmi.PortableRemoteObject.narrow
(anObject, javax.sql.DataSource.class);
    }
```

Next, a problem location line number and error code are output, using a tool, for each reception number assigned (Step 202). The tool used here may be a commercially available tool or a user-written tool. A tool that has a function capable of outputting problem location line numbers and error codes is used. In this way, possible problem locations (for which automatic determination of the presence or otherwise of a problem is not possible) are extracted automatically using a tool. There are cases where a plurality of possibilities will be indicated for a single line. Tool analysis may include the following kind of analysis, for example:

Line number=1, error number=D1001

(First character of class name is lower-case.)

In analysis by means of a tool, it is also possible to reference knowledge database information.

Following this, information (line number, error code) output by the tool, the knowledge database, program code, and similar analysis support information is provided to the analyst 20 (Step 203). The analyst 20 identifies the problem while referring to the notified information (line number, error code), knowledge database, and program code. Then the analytical server 30 receives a record of analysis results such as problem identification by the analyst 20, solution, and so forth (Step 204).

As manual analysis:

Analysis by tool

Line number=5, error number=D1000

(Possibility of problem in data source acquisition method)

Manual analysis

Line number=5 method lookup is generally included in method doPost. Data source acquisition need only be executed once at the time of class initialization.

Result: Line number=5, error number=D1000 is indicated as a problem.

If a new error pattern not previously experienced is discovered, the error code, problem point, and solution are input together to the knowledge database (Step 205). The output at this time comprises the line number and error code.

Next, as a report creating function in the analytical server 30, problem point and solution retrieval is carried by means of the knowledge database using an error code for a problem indicated by a tool and a problem indicated manually (Step 206). Then, the retrieved problems and solutions are output together with the line numbers as a report (Step 207).

As a merge of these analysis results:
Analysis results merge
From
Line number=1, error number=D1001
Line number=5, error number=D1000
Report
Line number=1
Problem point (First character of class name is lower-case, violating a general Java rule.)
Correction (First character of class name should be defined as upper-case.)
Line number=5
Problem point (Data source acquisition has been performed for each transaction, which is not desirable from a performance standpoint.)
Correction (Perform data source acquisition in initialization processing, or provide for batch management.)
Example:

```
init ( ) {
    ....
    Object anObject = initialContext.lookup (aName);
    datasource
    = (javax.sql.DataSource)javax.rmi.PortableRemoteObject.narrow
    (anObject, javax.sql.DataSource.class);
    ....
}
```

Thus, according to this embodiment, differentiation is performed between problems that can be analyzed with a tool and problems to be analyzed manually, and work efficiency can be improved by introducing support techniques for parts analyzed manually. Also, the level of problem solutions can be improved by introducing techniques that support analysis using experience accumulated in the past. Moreover, a configuration is also possible whereby results of analysis with a tool are provided to the user 10 quickly as quick evaluation results. Furthermore, high-quality service can be offered to the user 10 side by providing the user 10 with a single report combining tool analysis results and manual analysis results.

As described above, according to the present invention, it is possible to easily identify problems, and so forth, in a program that includes a part that can be customized, or problems, and so forth, in the code of a Java program or the like, and thereby offer a user a fast and useful analysis service.

We claim:

1. An analytical server connected to a network, the analytical server comprising:
a component for analyzing problems in Java program code by performing a method comprising:
obtaining results of an automated analysis with respect to Java program code obtained over the network, wherein the automated analysis results are generated by a tool configured to identify a set of automatically identified problems in the Java program code by corresponding problem identifiers and problem locations using a set of predetermined evaluation criteria;
providing the Java program code, the automated analysis results, and a knowledge database for use by an analyst in performing a manual analysis with respect to the Java program code, wherein the knowledge database includes a set of problem records, each problem record including: a description of a problem, a description of a solution for the problem, and a unique problem identifier for the problem;
obtaining results of the manual analysis with respect to the Java program code, the manual analysis results including a set of manually identified problems, distinct from the set of automatically identified problems, by corresponding problem identifiers and problem locations;
creating a report by merging the automated analysis results and the manual analysis results, wherein the creating includes, for each problem identifier in the automated analysis results and the manual analysis results:
acquiring a problem record from the knowledge database using the problem identifier; and
adding an entry for the problem identifier to the report based on the problem record, the entry including: the problem location corresponding to the problem identifier, the description of the problem in the problem record, and the description of the solution for the problem in the problem record.

2. The analytical server according to claim 1, the method further comprising creating and providing a design information viewer for use in the manual analysis, wherein the design information viewer enables an analyst to reference and query design information corresponding to the Java program code, and wherein the design information comprises information necessary for parameter setting for executing the Java program code.

3. The analytical server according to claim 1, the method further comprising creating and providing an explanatory material selection sheet for use by a developer of the Java program code, wherein the explanatory material selection sheet indicates contents necessary for material creation from the results of the manual analysis.

4. The analytical server according to claim 1, wherein the set of predetermined evaluation criteria include: a set of criteria relating to database operations in a form, a set of criteria relating to fields in the form, a set of criteria relating to views in a database, and a set of criteria relating to a script in one of: a form or a view.

5. The analytical server according to claim 1, the method further comprising correlating the set of automatically identified problems into an evaluation result, the evaluation result indicating whether at least one cause of deterioration was found by the tool.

6. The analytical server according to claim 1, the method further comprising:
executing the tool configured to identify the set of automatically identified problems in the Java program code; and
providing the Java program code for evaluation by the tool in response to receiving the Java program code over the network.

7. The analytical server according to claim 1, the method further comprising generating a quick evaluation report based on the automated analysis results, and providing the quick evaluation report for use by a developer of the Java program code prior to obtaining the manual analysis results.

8. The analytical server according to claim 7, wherein the generating the quick evaluation report is further based on a design information viewer, wherein the design information viewer enables a user to reference and query design information corresponding to the Java program code, and wherein the design information comprises information necessary for parameter setting for executing the Java program code.

9. A method for analyzing problems in Java program code, the method comprising:

obtaining results of an automated analysis with respect to Java program code obtained over a network at a computer system including at least one computing device, wherein the automated analysis results are generated by a tool configured to identify a set of automatically identified problems in the Java program code by corresponding problem identifiers and problem locations using a set of predetermined evaluation criteria;

providing the Java program code, the automated analysis results, and a knowledge database for use by an analyst in performing a manual analysis with respect to the Java program code using the computer system, wherein the knowledge database includes a set of problem records, each problem record including: a description of a problem, a description of a solution for the problem, and a unique problem identifier for the problem;

obtaining results of the manual analysis with respect to the Java program code at the computer system, the manual analysis results including a set of manually identified problems, distinct from the set of automatically identified problems, by corresponding problem identifiers and problem locations;

creating a report by merging the automated analysis results and the manual analysis results using the computer system, wherein the creating includes, for each problem identifier in the automated analysis results and the manual analysis results:

acquiring a problem record from the knowledge database using the problem identifier; and adding an entry for the problem identifier to the report based on the problem record, the entry including: the problem location corresponding to the problem identifier, the description of the problem in the problem record, and the description of the solution for the problem in the problem record.

10. The method according to claim 9, further comprising creating and providing a design information viewer for use in the manual analysis, wherein the design information viewer enables an analyst to reference and query design information corresponding to the Java program code, wherein the design information comprises information necessary for parameter setting for executing the Java program code.

11. The method according to claim 9, further comprising creating and providing an explanatory material selection sheet for use by a developer of the Java program code, wherein the explanatory material selection sheet indicates contents necessary for material creation from the results of the manual analysis.

12. The method according to claim 9, wherein the set of predetermined evaluation criteria include: a set of criteria relating to database operations in a form, a set of criteria relating to fields in the form, a set of criteria relating to views in a database, and a set of criteria relating to a script in one of: a form or a view.

13. The method according to claim 9, further comprising correlating the set of automatically identified problems into an evaluation result, the evaluation result indicating whether at least one cause of deterioration was found by the tool.

14. The method according to claim 9, further comprising:

executing the tool configured to identify the set of automatically identified problems in the Java program code; and providing the Java program code for evaluation by the tool in response to receiving the Java program code over the network.

15. The method according to claim 9, further comprising generating a quick evaluation report based on the automated analysis results, and providing the quick evaluation report for use by a developer of the Java program code prior to obtaining the manual analysis results.

16. The method according to claim 15, wherein the generating the quick evaluation report is further based on a design information viewer, wherein the design information viewer enables a user to reference and query design information corresponding to the Java program code, and wherein the design information comprises information necessary for parameter setting for executing the Java program code.

* * * * *